(Model.)
C. R. BRINCKERHOFF.
Boring and Mortising Machine.
No. 230,735. Patented Aug. 3, 1880.
3 Sheets—Sheet 1.
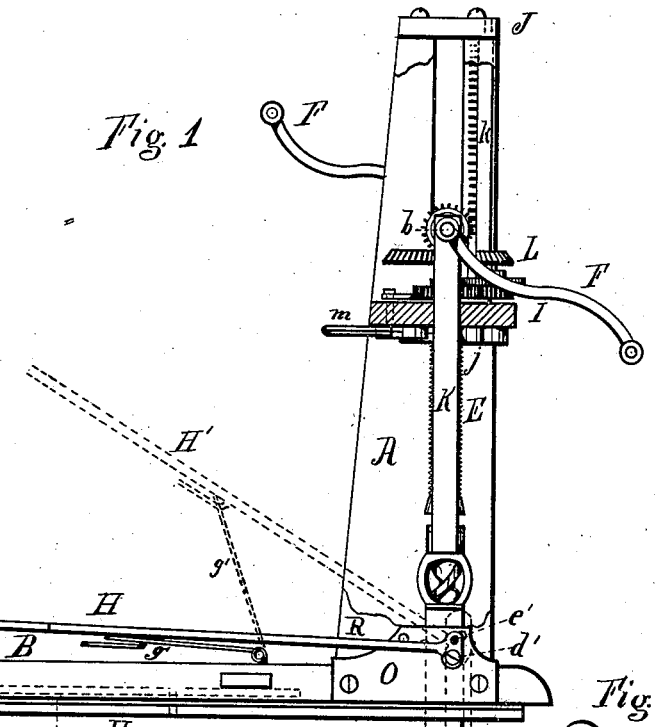
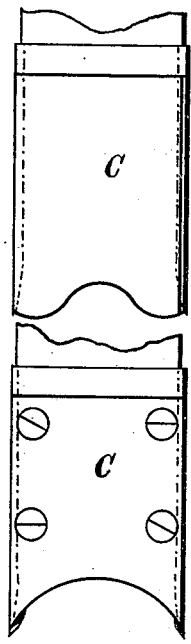
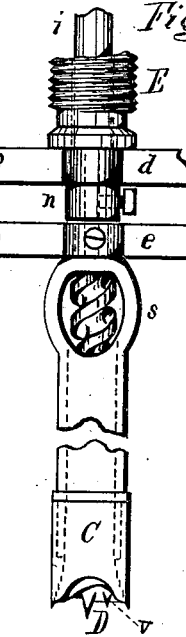
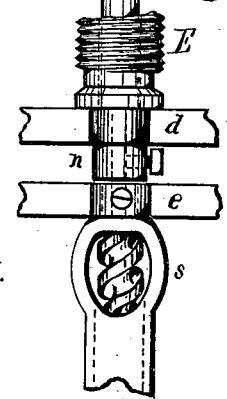
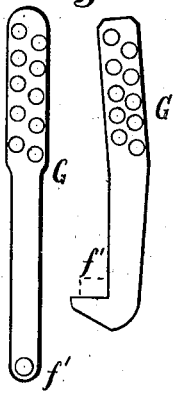
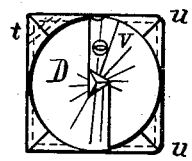
Witnesses..
W. M. Rebasz, Jr.
C. R. Parsons.
Inventor.
Cornelius R. Brinckerhoff (Model.)
C R. BRINCKERHOFF.
Boring and Mortising Machine.
No. 230,735.        Patented Aug. 3, 1880.
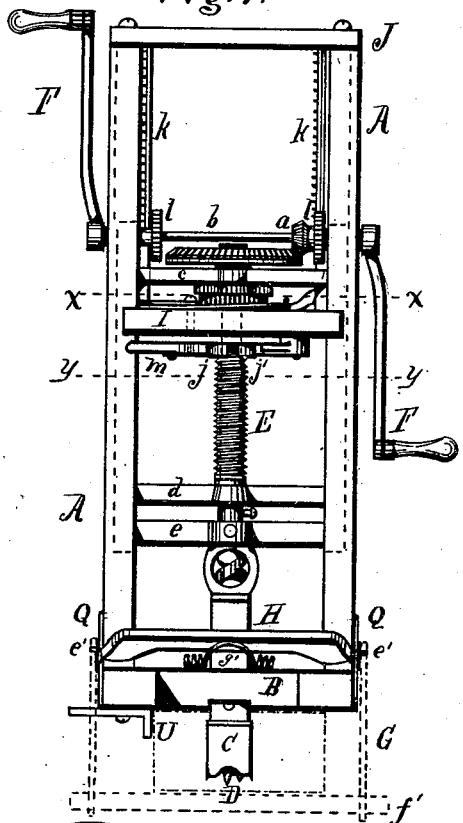
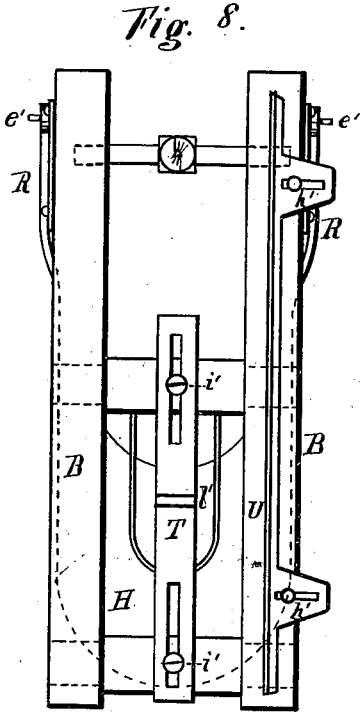
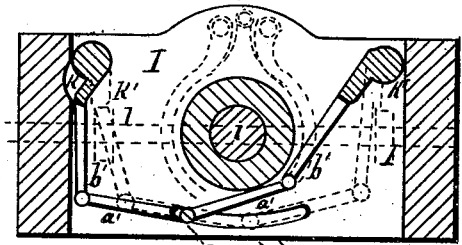
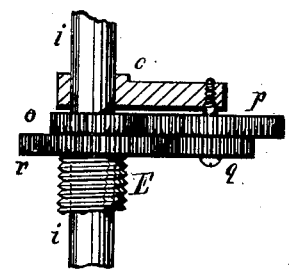
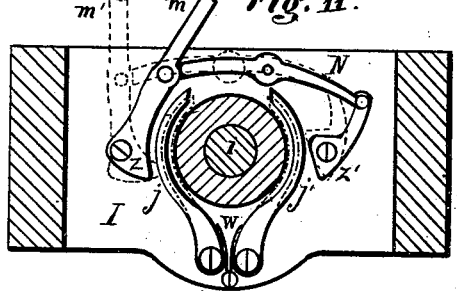
Witnesses.
Inventor.

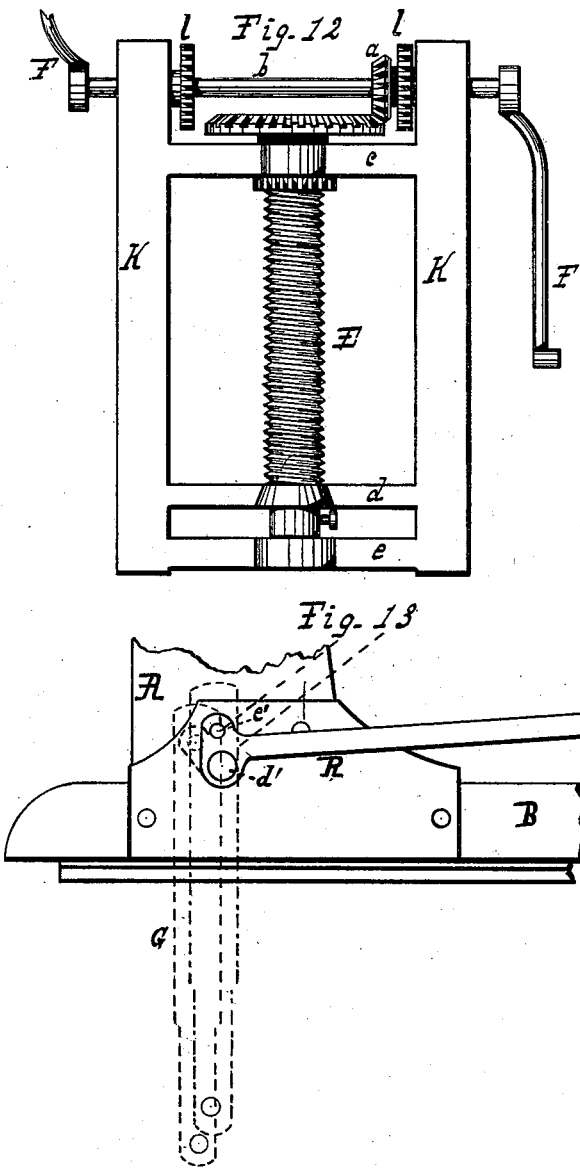

UNITED STATES PATENT OFFICE.

CORNELIUS R. BRINCKERHOFF, OF ROCHESTER, NEW YORK.

BORING AND MORTISING MACHINE.

SPECIFICATION forming part of Letters Patent No. 230,735, dated August 3, 1880.

Application filed June 19, 1880. (Model.)

*To all whom it may concern:*

Be it known that I, CORNELIUS R. BRINCKERHOFF, of Rochester, New York, have invented an Improved Boring and Mortising Machine, of which the following is a specification, reference being had to the annexed drawings, in which—

Figure 1 is a side elevation of my improved boring and mortising machine. Fig. 2 shows the chisel and auger and mode of connecting the same with the feed-screw. Fig. 3 shows the point of the auger and chisel. Figs. 4 and 5 are side views of the chisel. Fig. 6 represents the clamps. Fig. 7 is a front elevation of my improved machine. Fig. 8 is a view of the base of the machine as seen from below. Fig. 9 is a transverse section on the line $x\,x$, Fig. 7, showing the parts below that line. Fig. 10 represents the feed-gears, and Fig. 11 is a transverse section on the line $y\,y$, Fig. 7, showing the shear-nut and parts above that line. Fig. 12 shows the sliding frame which supports the crank-shaft and feed-screw. Fig. 13 is a side view of the clamping device.

My invention relates to an improved hand-power boring and mortising machine, for use in the preparation of timber for framing for buildings and other purposes; and my invention consists in the novel combination and arrangement of the parts constituting my improved mortising-machine—viz: the auger and chisel, feed-screw, reciprocating frame and elevating racks, and their various operating devices, as hereinafter more fully set forth.

My invention also consists in the combination of the auger, feed-screw, feed-gearing, shear-nut, and vertically-sliding supporting frame.

My invention also consists in an improved clamping device for boring-machines, arranged to be operated by the weight of the workman.

My invention also consists in the various mechanical details of construction, as hereinafter more fully set forth.

My improved boring and mortising machine is represented in the accompanying drawings.

A A, Figs. 1 and 7, is the upright frame of the machine, and B the base. C is the square chisel which surrounds the auger D; E, the feed-screw, and F F hand-cranks for operating the machine. G, Figs. 1 and 7, is the clamping device, and H the lever or seat for operating the same.

The base B of the machine is a frame-work constructed of materials of sufficient strength in any suitable way. The standards A A arise from the base of the machine at a suitable distance apart, and are connected together by a cross-piece, I, near the middle of their height, and by a cap, J, at their upper extremity.

The cross-piece I may be of iron or wood, and made in one or more pieces, for the purpose of facilitating the manufacture of the machine.

In Fig. 1, the nearest standard is broken away, in order to show the sliding frame K, which supports the crank-shaft $b$, feed-screw E, bevel-pinion and gear $a$ and L, and the auger and chisel C and D. The frame K consists of two uprights secured together by cross-bars $c$, $d$, and $e$, Fig. 7, these cross-bars being provided with suitable journals for the auger-shaft $i$, the feed-screw E, and the chisel C.

The frame K slides up and down in grooves in the vertical standards A A. The frame, auger, chisel, and attachments are fed downward by the rotation of the feed-screws E, operating in the shear-nut $j\,j'$, Figs. 7 and 11.

The frame is elevated by the pivoted racks $k\,k$, Figs. 1 and 7, which are arranged to be swung into or out of mesh with the gears $l\,l$ on the crank-shaft $b$.

The racks $k\,k$ terminate at each end in pivots which turn freely in journals in the cap J and in the cross-bar I at their upper and lower extremities. By rotating the racks $k\,k$ on their pivots they may be thrown into or out of mesh with the gears $l\,l$, the two positions of the racks being shown at $k\,k\,k'\,k'$ in Fig. 9.

When the racks are in mesh with the gears the frame K and its attachments will be elevated by the rotation of the crank-shaft $t$. The auger D is rotated from the crank-shaft $b$ by means of the bevel-pinion $a$, gear L, Fig. 1, and shaft $i$, Figs. 2 and 10, which extends downward through the feed-screw E and terminates below the cross-bar $d$, Fig. 2, in a socket, $n$, into which the shank of the auger D is fastened by a set-screw.

Immediately below the upper cross-bar, $c$, of the frame K a pinion, $o$, Fig. 10, secured to the shaft $i$, drives the gear $p$, which rotates on a stud fastened in an arm projecting from the cross-bar c. A pinion, q, is attached to the gear p and rotates with it. The pinion q meshes with the gear r on the upper end of the hollow feed-screw E. Motion is thus communicated to the feed-screw at a reduced rate of speed.

The feed-screw rotates in the shear-nut j j', and causes the frame K to descend, forcing the auger and chisel into the timber. The chisel is secured in the lower cross-bar, e of the frame K by a set-screw or other suitable clamping device.

A shoulder on the chisel bears against the lower side of the cross-bar e. The upper end of the chisel is made larger than the auger, as represented at s, Fig. 2, and the enlargement is perforated with two or more holes for the escape of the chips brought up by the auger.

The chisel and cutting-edge may be constructed in one piece; but I prefer to make the cutting-edge thereof changeable, as shown in Fig. 2. This may be accomplished by making the cutting portion in one or more parts, secured to the body of the chisel by screws, or of a single piece, which may be fastened by screws or by pins driven diagonally through the corners of the body of the chisel, as shown at t, Fig. 3.

The corners of the cutting portion of the chisel may be left full; but I prefer to cut them off slightly or to give them a rounded form, as shown at u, Fig. 3, so that the corners of the mortise made by the chisel will compress the corners of the tenon driven into the mortise. The chisel may have either straight or curved cutting-edges.

The forms shown in Figs. 4 and 5 I have found well adapted for mortising hard wood, the chisel being provided with two concave edges, as in Fig. 5, which are used transversely of the grain of the wood, while the other two edges, which divide the wood lengthwise of the grain, may be of any desired form—that shown in Fig. 4, for instance.

My experience shows that there is considerable saving in power by the use of concave transverse cutting-edges.

Any suitable form of auger may be used in my improved boring and mortising machine. It should be enlarged at its lower end, so that the outer portion of the cutting-edge may describe a circle of a diameter equal to the transverse dimensions of the square chisel. I prefer to use an auger having only one cutting-edge, as I have found that the machine operates more satisfactorily with a single-lipped boring-tool.

I use a cutting-spur, V, Figs. 2 and 3, placed between the center and periphery of the auger, for the purpose of dividing the chips and facilitating their discharge by the auger through the square chisel. This spur may be located in any preferred position between the center and the periphery of the cutting-edge of the auger, and may be used with an auger either with or without a spur at its outer point. The spur V may be in one piece with the auger, or it may be screwed or riveted thereon.

To the lower side of the cross-piece I are pivoted the jaws of the shear-nut j j', Fig. 11, which are threaded on their inner sides to correspond with the feed-screw E. The jaws are separated by the spring w. A handle, m, serves to operate the pivoted cams z z' by means of the connection N. The cams z z' are so arranged as to throw the jaws into mesh with the feed-screw, as indicated by dotted lines in Fig. 11. A stud, P, Fig. 9, attached to the connection N and passing through the cross-piece I, serves to rotate the pivoted elevating-racks by means of rods a' a', pivoted to the ends of the arms b' b', connected to the racks k k. By this arrangement provision is made so that when the shear-nut is in mesh with the feed-screw E the racks are necessarily out of mesh with the gears on the crank-shaft, and vice versa, since both the shear-nut and the racks are controlled by the same handle m.

The standards A A are secured to the base B by the plates Q Q, Figs. 1 and 7, which may, for additional strength, be provided with flanges passing into the wood of the standard or base.

The seat H is provided on each side with metallic bars R R, Fig. 8, which extend along the base and are pivoted so as to turn freely on screws or pins d', Fig. 1, screwed in the plates Q Q. The ends of the bars R R are made wide enough to receive not only the screws d', but also the pins e' e', to which the clamps G, Fig. 6, are pivoted. The clamps G extend downward below the base of the machine, and are connected together below the timber to be mortised by the clamp-bar f', the length of the clamps G being adjusted to the depth of the timber by inserting the pins e' e' into some of the holes with which the upper end of the clamps is provided.

The machine is secured to the wood by forcing down the seat H, causing the pins e' e' to revolve about the screws d' d', and drawing upon the clamp-bar f'. The position of the seat when the machine is clamped to the timber is represented at H, Fig. 1.

A spring, g', holds the seat in the elevated position H' when the machine is not clamped to the work.

To the under side of the base B are attached gages T and U, Figs. 1, 7, and 8. The gage U determines the distance of the mortise from the side of the timber. It is arranged to be adjusted transversely of the machine by screws passing through slotted holes h', Fig. 8. The gage T is intended to facilitate the laying out of the mortises with respect to each other lengthwise of the timber. It is arranged to be operated longitudinally on the base of the machine by the screws i' i', Fig. 8. The gage T is provided with a lug or projection, l', which projects downward and enters a mortise already made, and determines the distance of the next mortise therefrom.

I prefer to use an auger without any worm or screw on its point, the center of the auger being made triangular.

From the preceding description the operation of my improved mortising-machine will be readily understood. The machine having been secured to the timber by the clamping device, the auger and square chisel are forced downward into the wood by the operation of the feed-screw E, the auger rotating within the chisel and removing the wood from the center thereof, while the corners outside of the auger are separated from the wood by the cutting-edges of the chisel, and the chips constituting the corners being removed by the rotation of the auger, which discharges all the chips through the enlargement at the upper end of the chisel. Square holes are in this way sunk into the wood to any required depth.

The mortise may be made of any desired length by sinking two or more holes next to each other.

The machine is located on the timber T, with reference to the side thereof or to the distance of the mortises from each other, by means of the gages U and T.

After the hole has been sunk the shear-nut is thrown out of mesh with the feed-screw, and the pivoted racks $k\ k$ at the same time brought into mesh with the gears $l\ l$ by the handle $m$, in which case the chisel and auger may be removed from the holes by turning the cranks F F. The shear-nut is then again engaged with the feed-screw, and the machine when properly located and clamped is ready to sink another hole.

In order to prevent the binding of the chisel in the hole and to facilitate its removal therefrom, I prefer to make the chisel toward its upper end smaller than the cutting-edges thereof.

By rotating the chisel in its socket in the cross-bar $e$ the mortise may be sunk at any desired angle with the length of the timber.

By the use of the hook-shaped clamp shown in Fig. 6 the machine may be set transversely of the timber for the purpose of cutting gains.

By removing the chisel my invention may be used as an ordinary boring-machine, the auger being forced downward by the feed-screw.

Instead of the feed-screw E and shear-nut $j\ j'$, a worm working into a stationary rack may be employed. In this case the rack should be pivoted so that it can be swung out of mesh with the worm.

I am aware that augers having more than one cutting edge or spur have been previously used, and such I do not claim; but I am not aware that augers having more than one cutting-spur have been used in connection with a mortising-chisel surrounding the same, and experience teaches me that the removal of the chips through the contracted opening in the chisel is materially facilitated by cutting them as fine as possible, and that the instrument requires less power, and is much less likely to become clogged when the auger is provided with one or more auxiliary cutting-spurs between its center and periphery.

The diameter of the body of the auger is necessarily smaller than its cutting-edge by the thickness of the sides of the chisel, and this increases the difficulty of removing the chips unless they are divided as finely as possible.

I make no claim herein for the combination of the chisel and auger when the latter is provided with an auxiliary cutting-spur, as I design to constitute that combination the subject-matter of another application for Letters Patent.

I claim—

1. The combination of the auger D, chisel C, feed-screw E, shear-nut $j\ j'$, reciprocating frame K, shaft $b$, gears $l\ l$, and pivoted elevating-racks $k\ k$, substantially as set forth.

2. The combination of the auger D and chisel C, shear-nut $j\ j'$, cams $z'\ z'$, connection N, and handle $m$, substantially as set forth.

3. The combination, with a hand-power mortising-machine, of the clamps G G, provided with a series of holes at their upper ends, clamp-bar $f'$, and the pivoted levers R R, having pins $e'\ e'$, substantially as set forth.

4. The combination of the auger D, chisel C, feed-screw E, shear-nut $j\ j'$, cams $z'\ z'$, and pivoted elevating-racks $k\ k$, rigidly connected with the shear-nut, substantially as and for the purposes set forth.

5. In combination with the supporting-frame A, the clamps G, pivoted levers R R, and seat H, substantially as described.

6. The combination of the auger D, chisel C, reciprocating frame K, hollow feed-screw E, surrounding shaft $i$, and gearing $o\ p\ q\ r$, substantially as described.

CORNELIUS R. BRINCKERHOFF.

Witnesses:
GEO. B. SELDEN,
CHARLES B. PARSONS.